United States Patent
Kraft et al.

(10) Patent No.: US 6,898,631 B1
(45) Date of Patent: May 24, 2005

(54) PLATFORM FOR INTERNET BASED REAL-TIME COMMUNICATION CONTENT SELECTION

(75) Inventors: Reiner Kraft, Gilroy, CA (US); Gaurav Tewari, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 670 days.

(21) Appl. No.: 09/689,076

(22) Filed: Oct. 12, 2000

(51) Int. Cl.⁷ .............................................. G06F 15/173
(52) U.S. Cl. ........................ 709/224; 709/201; 709/228; 709/232; 709/318; 379/1.03; 379/27.01; 379/32.01; 379/88.08; 379/88.12; 379/88.22; 710/14; 710/52; 714/39; 714/47
(58) Field of Search ................................ 709/201, 223, 709/224, 228, 232, 318

(56) References Cited

U.S. PATENT DOCUMENTS

| | | | |
|---|---|---|---|
| 5,721,763 A | | 2/1998 | Joseph et al. |
| 5,793,365 A | | 8/1998 | Tang et al. |
| 5,870,744 A | | 2/1999 | Sprague |
| 5,884,033 A | * | 3/1999 | Duvall et al. |
| 5,893,091 A | * | 4/1999 | Hunt et al. |
| 6,181,364 B1 | * | 1/2001 | Ford |
| 6,266,664 B1 | * | 7/2001 | Russell-Falla et al. |
| 6,332,120 B1 | * | 12/2001 | Warren |
| 6,332,139 B1 | * | 12/2001 | Kaneko et al. |
| 6,606,644 B1 | * | 8/2003 | Ford et al. |
| 6,799,199 B1 | * | 9/2004 | Segal et al. .................. 709/207 |
| 2001/0029501 A1 | | 10/2001 | Yokobori et al. |

OTHER PUBLICATIONS

Fact Sheet—*Surf Monkey Kids Channel*—dated Oct. 1, 1999, 3 pages.
Fact Sheet—*Symantec Corporation—Free net nanny Filtering software*—dated Oct. 1, 1999, 3 pages.

* cited by examiner

Primary Examiner—Hosain Alam
Assistant Examiner—Michael Y Won
(74) Attorney, Agent, or Firm—Delio & Peterson, LLC; Leonard T. Guzman (57) ABSTRACT

A method of monitoring real-time communication on a computer network between at least two client computers connected by the network comprising first providing a database of keywords, with each of the keywords linked to a predefined rating. The method then includes monitoring real-time communication on a computer network between at least two client computers connected by the network; detecting the keywords in the real-time communication; and determining for the real-time communication a rating level based upon the predefined rating of the keywords. The keyword may consist of text, audio, video and graphical communication, for example. Preferably, the rating level of the real-time communication is conveyed to at least one of the client computers. More preferably, at least one additional client computer receives the real-time communication, and the rating level of the real-time communication is conveyed to the at least one additional client computer. Determination of the rating level for the real-time communication may occur simultaneously with the real-time communication, and may be based on evaluation of individual ratings of a plurality of different keywords. The method may further include terminating the real-time communication of at least one of the client computers based upon the rating level.

19 Claims, 3 Drawing Sheets

PLATFORM FOR INTERNET BASED REAL-TIME COMMUNICATION CONTENT SELECTION

BACKGROUND OF THE INVENTION

1. Field of the Invention

The present invention relates to information monitoring technologies in the context of real-time network or Internet communication, and in particular to a method and system for monitoring real-time communication on a computer network between at least two client computers connected by the network.

2. Description of Related Art

The seminal importance of the Internet as a generalized communication medium has been clear from the very outset. As the Internet has surged in popularity, however, it has begun manifesting itself in nontraditional ways, the scope of which had never been fully anticipated. In particular, with the exponential rise in the number of Internet users, real-time Web based interaction, such as seen in Internet Chat, has emerged as an amazingly popular and persuasive mode of communication.

On the Internet, the term chatting is used to refer to the act of "talking" by text or graphical communication to other people who are using the Internet at the same time. Typically, chatting involves the broadcast, multicast, or unicast of messages, typed in real-time, among a group of users occupying the same space or channel (i.e., connected to the same server or related group of servers) on the Internet. The users themselves may be situated in different geographical locales and may be connected using any number of different client programs, browsers, or Internet service providers (ISPs). The key point is that a single Internet site (the "chat site") serves as a common repository for all messages. Chats may be ongoing, or scheduled, and users may enter and leave the chat site at will.

Typically, most chats are focused on a particular topic or theme. A given chat site may be a host to multiple chats, each corresponding to a different theme yet taking place at the same time in different "chat rooms"—which are essentially specialized sub-domains within the broader chat-site. Hence, participants within the same chat-room generally share some common interest or concern, which brings them together.

Chats may be hosted by online services (such as America Online), by bulletin board services and by Web sites. Many Web sites, such as Talk City, in fact exist exclusively for the purpose of conducting chats. Most chat sites use a popular protocol called Internet Relay Chat (IRC) for client-server handshaking and subsequent client-server and client—client interaction. IRC was first made public in RFC 1459, released in May 1993. Besides the exchange of text messages, a chat may also include the use of sound and graphics, provided that the bandwidth capability and appropriate programming are accessible. Currently, most chat activity appears to be informal and recreational in nature. However, specialized channels where professionals exchange valuable opinions and engage in constructive dialogue are becoming increasingly prevalent.

Since, by its very nature, the content of chats is generated in real-time, it is very difficult, if not impossible to be able to classify the nature of the content exchanged in chat rooms in advance of joining the chat. Even though current chat servers attempt to classify their chat rooms using general heuristics such as "Adult", "Teenagers", "Kids" and the like, and to cluster rooms accordingly, the actual content exchanged within a given room is by no means guaranteed to conform to its predefined classification. The situation becomes even more complex when chat content includes non-text data, for example, audio or images. Surrounding text does not always indicate the content of the embedded file, allowing offensive audio or image material to slip through the ratings system. Occasionally, people deliberately even mislabel offensive audio or image files in order to mislead monitoring devices.

Content rating for static web pages, and also for dynamic pages (e.g., search result pages) is already done using various techniques. These include Internet filters such as Net Nanny and Cyber Patrol, and the method and system disclosed in U.S. patent application Ser. No. 09/374,644, entitled "Automatic" Rating and Filtering of Data Files for Objectionable Content."

Even though Internet chat is increasingly being used by people as a form of informal communication, no general technique has been developed which can use a uniform criteria to provide an objective and accurate rating for the content exchanged during such discourse in real-time, and which can subsequently manifest as an Internet portal for chat rooms clustered according to such ratings. Since the content of chat rooms (or any other such form of Internet based real-time communication) is highly dynamic, even if static ratings are specified for such rooms, there is no guarantee that the static rating is actually representative of the content (i.e., text or graphics) currently being exchanged. Moreover, any classification which may be provided by the chat-host server are often very subjective, and such classifications are not comparable across multiple hosts, since the classification criteria may vary from source to source. Hence there is the compelling need for a service that can dynamically deduce ratings of objectionable or other type material in real-time and which uses a standardized, uniform rating criteria, such that comparison among ratings is meaningful.

Bearing in mind the problems and deficiencies of the prior art, it is therefore an object of the present invention to provide a method of monitoring real-time communication on a computer network between at least two client computers connected by the network.

It is another object of the present invention to provide a method of monitoring real-time communication between client computers over a network which establishes a uniform rating system.

A further object of the invention is to provide a real-time rating system for users of Internet chat rooms which alerts the users of objectionable material prior to joining the chat.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, to a method of monitoring real-time communication on a computer network between at least two client computers connected by the network comprising first providing a database of keywords, with each of the keywords linked to a predefined rating. The method then includes monitoring real-time communication on a computer network between at least two client computers connected by the network; detecting the keywords in the real-time communication; and determining for the real-time communication a rating level based upon the predefined rating of the keywords. The keyword may consist of text, audio, video and graphical communication, for example. Preferably, the rating level of the real-time communication is conveyed to at least one of the client computers. More preferably, at least one additional client computer receives the real-time communication, and the rating level of the real-time communication is conveyed to the at least one additional client computer.

Determination of the rating level for the real-time communication may occur simultaneously with the real-time communication, and may be based on evaluation of individual ratings of a plurality of different keywords. The method may further include terminating the real-time communication of at least one of the client computers based upon the rating level.

The method may also include predetermining at a first of the at least two client computers a maximum rating level at which the real-time communication may be maintained. If one or more keywords are originated at a second of the at least two client computers, the method then triggers a rating level above the maximum rating level, and terminates real-time communication of the first client computer.

Further, the method may include predetermining a maximum rating level at which the real-time communication may be maintained. If one or more keywords are originated at one of the client computers which triggers a rating level above the maximum rating level; the method then identifies the one client computer originating the keyword above the maximum rating, and/or terminates real-time communication of the one client computer.

The rating level determined for the real-time communication may be continuously updated, for example, based upon the highest keyword rating within a selected time period, based upon a weighted average of keyword ratings within a selected time period, or based upon highest and lowest keyword ratings within a selected time period.

The method may also include connecting a subsequent client computer to the network without establishing real-time communication, viewing at the subsequent client computer the rating level of the real-time communication, and connecting the subsequent client computer to the real-time communication based upon the rating level.

Separate real-time communication occurs between different groups of client computers, wherein the method includes determining a rating level for the real-time communication for each group of client computers.

In another aspect, the present invention provides a method of monitoring real-time communication on a computer network between at least two client computers connected by the network comprising first providing a real-time communication monitoring system on a computer network including a database of keywords, with each of the keywords linked to a predefined rating. The system is adapted to: i) monitor real-time communication between at least two client computers connected by the network; ii) detect the keywords in the real-time communication; and iii) determine for the real-time communication a rating level based upon the predefined rating of the keywords. The method then includes connecting a subsequent client computer to the network without establishing real-time communication with the at least two client computers; viewing at the subsequent client computer the rating level of the real-time communication between the at least two client computers; and connecting the subsequent client computer to the real-time communication based upon the rating level.

In a further aspect, the present invention provides a system for monitoring real-time communication on a computer network between at least two client computers connected by the network comprising a database of keywords, each of the keywords linked to a predefined rating; means for monitoring real-time communication on a computer network between at least two client computers connected by the network; means for detecting the keywords in the real-time communication; and means for determining for the real-time communication a rating level based upon the predefined rating of the keywords.

In a related aspect, the present invention provides a computer program product for monitoring real-time communication on a computer network between at least two client computers connected by the network comprising a database of keywords, each of the keywords linked to a predefined rating; program code means for monitoring real-time communication on a computer network between at least two client computers connected by the network; program code means for detecting the keywords in the real-time communication; and program code means for determining for the real-time communication a rating level based upon the predefined rating of the keywords.

In yet another aspect, the present invention provides a program storage device readable by a machine, tangibly embodying a program of instructions executable by the machine to perform a method for monitoring real-time communication on a computer network between at least two client computers connected by the network using a database of keywords, with each of the keywords linked to a predefined rating. The method comprises monitoring real-time communication on a computer network between at least two client computers connected by the network; detecting the keywords in the real-time communication; and determining for the real-time communication a rating level based upon the predefined rating of the keywords.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1–3 of the drawings in which like numerals refer to like features of the invention. Features of the invention are not necessarily shown to scale in the drawings.

The present invention generally provides a method for rating and classifying data for objectionable or other content which is continuously available a user at a client computer. More particularly, it relates to methods for automatically and continuously rating and filtering data presented in the context of real-time Internet based communication, such as chat sessions, and then dynamically classifying the underlying data channels on a portal site, intended to be used as an entry point to these channels.

In its preferred embodiment, the present invention involves an improvement to the patent application "System and Techniue for Dynamic Information Gathering and Targeted Advertising in a Web Based Model Using a Live Information Selection and Analysis (LISA) Tool, U.S. patent application Ser. No. 09/511,846 filed on Feb. 24, 2000, the disclosure of which is hereby incorporated by reference. While the present invention may be generalized to any mode of real-time communication on the Internet, the non-limiting example presented herein will focus specifically on the case of Internet chat.

Figure 1:
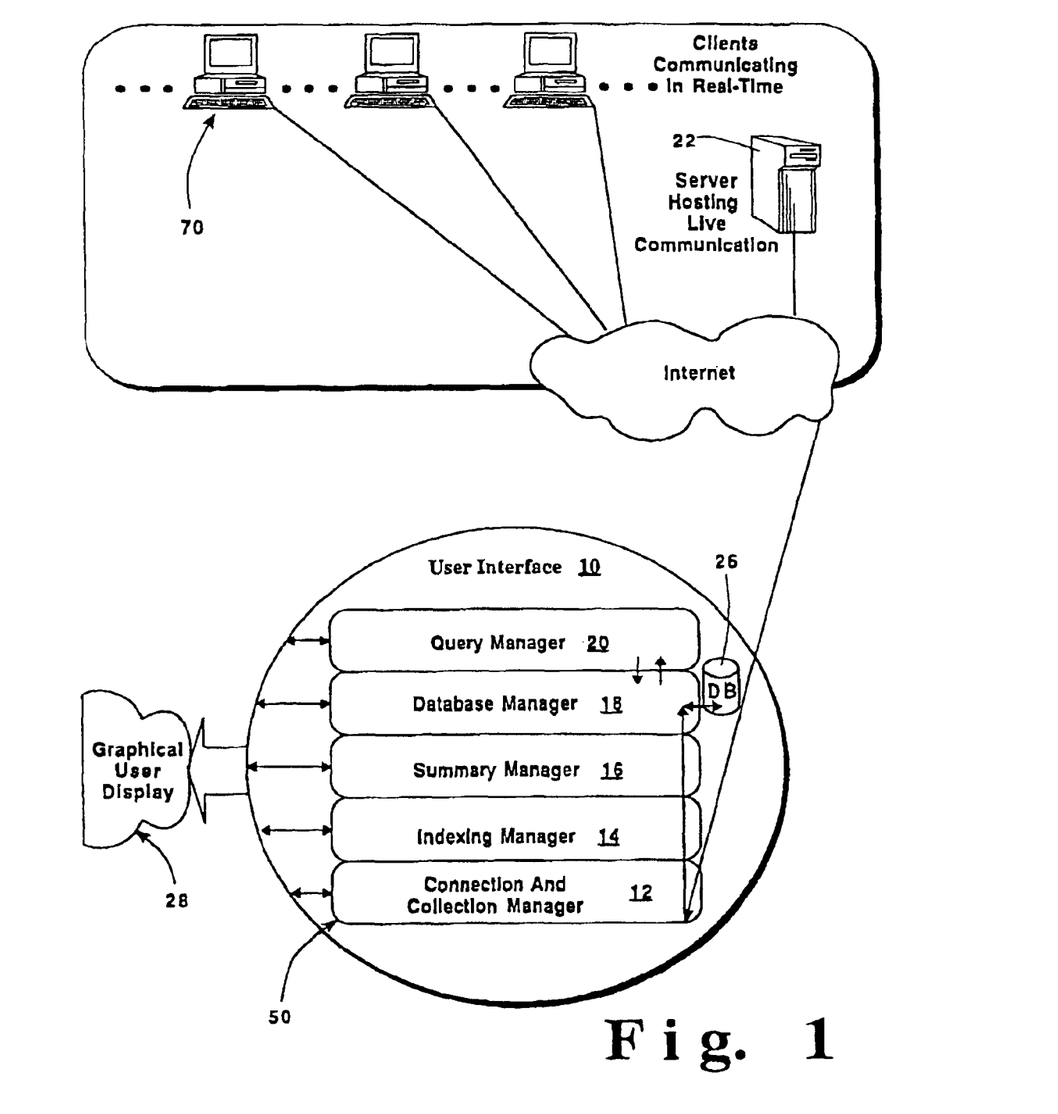
FIG. 1 is a schematic representation of the Live Information Selection and Analysis "LISA" tool employed in connection with the present invention.

As shown in FIG. 1, in a first aspect, the Live Information Selector and Analyzer (LISA) 90 may typically comprise the following components:

A) User Interface—10
B) Connection and Collection Manager—12
C) Indexing Manger—14
D) Summary Manager—16
E) Database Manager—18
F) Query Manager—20

The functionality of each of the typical LISA system components is as follows:

User Interface 10: User Interface 10 is the component of the system which will directly interact with the user or client computer 11. All interaction between LISA and the user is mediated by the user interface 10. The user interface 10 is responsible for getting crucial configuration parameters from the user and initializing the other components of the system as appropriate.

The user interface 10 prompts the user for the address of the server 22 where the real-time communication of interest is being held. The user has the option of either specifying a URL to be accessed using the Hyper Text Transmission Protocol ("HTTP"), or may choose to simply give the address of an Internet relay chat ("IRC") server to be accessed directly, using a sockets-based connection employing Transmission Control Protocol/Internet Protocol ("TCP/IP"). Depending upon the user's choice, the user interface 10 automatically prompts the user for all other relevant parameters necessary to establish the connection. For instance, the user may be prompted to enter a screen-name, by which LISA should register with the chat server if the server 22 requires such a specification, and other such essential information.

The user interface 10 also allows the user to optionally customize the indexing and summarizing operations, and personalize these according to the user's preferences. For instance, the user may wish to explicitly specify the attributes that ought to be included in a summary, and can thus augment or override the default options. The user may also customize the graphical presentation and formatting of the data and the search query results using the user interface 10.

Connection and Collection Manager 12: The Connection and Collection Manager 12 is a software component of LISA which is responsible for actually connecting to the server of interest and then collecting the relevant information.

Depending upon the user's specifications, Connection and Collection Manager 12 can connect to server 22 of interest in one of two ways:

URL Based Connection using HTTP: In this case the user will specify a string of the form "http:// . . . " The Connection and Collection Manager 12 may then use Java Networking tools to open a "URL connection" to the server. In many cases, this will require that the user should already have registered manually with the server, and have specified a user-name and password with which to initiate the connection.

The Connection and Collection Manager 12, to an extent, emulates a Web browser, which would be the normal way to connect to a server using HTTP. In order to accomplish this, the Connection and Collection Manager 12 intercepts all "cookies" sent from the server (which thinks that it is connected to a browser), and extracts the name and value fields of these cookies.

"Cookies" are a way for a server (or a servlet running on a server) to send information to a client computer to store, and for the server to later receive its data from that client computer. Servlets send cookies to clients by adding fields to HTTP response headers. Clients (or client computers) are expected to automatically return cookies by adding fields to HTTP request headers. Each HTTP request and response header is named and has a single value. For example, a cookie could have a header named "chatRoom" with a value "Politics", indicating to the calling application that the user wants to join the chat room called "Politics". For all future HTTP requests made to the server, the Connection and Collection Manager 12 adds the appropriate fields to HTTP request headers, thus emulating a browser application.

In order to connect successfully, the Connection and Collection Manager 12 may need to specify a username and a password that are already known by the server, and which correspond to an existing account. The Connection and Collection Manager 12 then specifies which "chat" room it wants to join. The exact methodology by which the Connection and Collection Manager 12 specifies these parameters will vary somewhat from one server to another, and the Connection and Collection Manager 12 is preferably manually pre-configured if a URL-based connection is desired. These parameters are specified to the server 22 by the Connection and Collection Manager 12, by appending cookie fields to HTTP request headers. Hence, the pre-configuration may require the user to specify the names and values of such cookies fields, since it is not always possible for the Connection and Collection Manager 12 to infer these directly.

For example, suppose the user instructs the Connection and Collection Manager 12 to open a URL based connection to the server "http://www.wbs.net." Further, suppose that the user is interested in connecting to a room called "talk.politics.misc," using screen name: "gaurav2000" and password: "ibmchat." In this case, when the Connection and Collection Manager 12 attempts to open a URL based connection to http://www.wbs.net using these parameters, the server returns a number of cookies. The Connection and Collection Manager 12 collects these cookies, extracts their name and value fields and appends them to all future HTTP request headers, ultimately generating an elaborate URL of the form: http://chat9.go.com:6666/webchat3.so?Room=talk, politics.misc&handle=gaurav2000&mu=142cadfl1820bc29d2f7f8a90245851843fe83d88543389 2&chatmode=push&zipcode=95120&dd=000000000000000000000000&n ofrills=1&fsection=output Connecting to this URL allows the Connection and Collection Manager 12 to successfully listen to all conversation being held within the "talk.politics.misc" room. To all other users, the Connection and Collection Manager 12 appears to be just another user, with the screen name: gaurav2000.

Socket Connection using TCP/IP: The limitation of a URL based connection using HTTP is that it is not generalizable to all servers, and can require significant user configuration. Additionally, in the URL-based connection model a chat server may insist on sending an applet to the Connection and Collection Manager 12 since, in this model, the Connection and Collection Manager 12 appears to be a Web browser. In such cases, a URL-based approach will not work, unless the functionality of the Connection and Collection Manager 12 is extended to allow it to accept and execute applets that communicate with servlets.

A socket based connection using TCP/IP overcomes many of the limitations of a URL-based approach, and is far more general. Typically, a socket-based approach is the preferred connection method for LISA.

The vast majority of Internet chat servers follow the Internet Relay Chat protocol. LISA's socket-based approach involves a direct socket connection to the server 22, and registering and connecting using standard IRC commands. The user will still, however, need to explicitly specify the name of the server to connect to, the port to connect at (usually in the range of 6666–7000 for IRC chat servers), what screen-name LISA should be visible as, which room to join, and other such essential parameters.

In attempting to open a socket-based connection to a server (say "chat.cnn.com," at port 7000), the Connection and Collection Manager 12 preferably follows the sequence of steps:

(i) Connection and Collection Manager 12 opens an input and output socket to the server, for reading and writing purposes respectively.

(ii) Connection and Collection Manager 12 attempts to send the server a command indicating that it wants to connect. For instance, it can send the server a "NICK" message. A "NICK" message is used to give a client a nickname or change the previous one. The syntax of a "NICK" command is: "NICK <desired nickname>."

(iii) Upon receiving a "NICK" command, the server becomes cognizant of the presence of the Connection and Collection Manager 12. The server then sends the Connection and Collection Manager 12 a unique session D) that identifies the client for this chat session. Specifically, the server sends the Connection and Collection Manager 12 a message of the form "PING <unique session id>."

(iv) Having received a "PING" message from the server, the Connection and Collection Manager 12 must respond with a corresponding "PONG" message of the format: PONG <unique session id>. This confirms to the server that the client is alive and that the client is aware of the unique session ID that has been allocated to it.

(v) Immediately after sending the PONG response, the Connection and Collection Manager 12 must complete "registration" with the server now that it knows how to identify itself (using the allocated unique session ID). A client is considered to be "registered" after both a valid NICK and USER command have been received from the client. As such, the Connection and Collection Manager 12 now sends the server a USER message to complete registration (the NICK message had already been sent in step (i)). The USER message is used at the beginning of connection to specify the username hostname, servername and realname of a new user. Hence the Connection and Collection Manager 12 will send a USER message of the form: "USER <username> <hostname> <servername>: <real firstname> <real lastname>."

Since it is easy for a client to lie about its username by relying solely on the USER message, many chat servers will actually attempt to verify the client's identity using an "Identity Server". If the host which a user connects from has such a server enabled, the user name is set to that in the reply from the "Identity Server". In the event that Identity server verification is not possible, some chat servers will refuse to allow the client to connect. Others will be more lenient, and will simply prefix the username of the client with a tilde (""), or other such distinguishing character to indicate that the client has not been authenticated, and allow the client to connect.

(vi) Having registered, the Connection and Collection Manager 12 must specify which chat room it wishes to join, by sending a JOIN command to the server. The syntax of the JOIN command is in the form: "JOIN #<desired room name>."

Provided that the room exists, the server 22 now connects the Connection and Collection Manager 12 as a chat participant within the specified room, where it will be visible with the desired NICK name specified as part of the NICK command in part (i).

Once the Connection and Collection Manager 12 has successfully connected with server 22, it will appear to be an ordinary client, and will be able to listen to all messages being broadcast by other clients as part of their real-time communication.

Depending upon user specifications, LISA may be completely passive, in that it only listens, and never actually says anything. In this event, this inactivity will most likely be noticed by the chat server. When a chat server detects a client that has been inactive for more than a certain amount of time, it will either "PING" the client to see whether it is still "alive" or will simply log the client out. As such, LISA can be adapted to either respond to "PING" requests with corresponding "PONG" replies, or can simply detect when it has been logged out, and immediately log back in. This preference can be specified by the user. LISA can detect whether it has been logged out when nothing is heard for a certain amount of time (which will be user-specified), or when an exception occurs in reading from the socket or URL, implying that the socket or URL connection no longer exists.

It should be noted that LISA provides the user with the option of simultaneously monitoring multiple live conversations in different chat rooms. To do this, the user must specify multiple "seeds", corresponding to URLs or addresses of the servers hosting these chat sessions, to the Connection and Collection Manager 12. Subsequently, the Connection and Collection Manager 12 will merely spawn off multiple (synchronized) threads, with each thread of execution corresponding to a unique conversation.

The Connection and Collection Manager 12 will directly transfer all chat-communication data received from the server connection(s) to the Indexing Manager 14. In addition to the text of the chat message, such data will include the user name of the individual responsible for initiating the message, as well as any parameters automatically appended by the answer. Such parameters may include the email address of the chatter and his "tagline", a client-configurable line of text that gives other clients information about this client, and which can include hyperlinks, perhaps to the client's Web page, and graphics, such as the client's photo.

Indexing Manager 14: The Indexing Manager 14 indexes the data given to it by the Connection and Collection Manager 12. Existing indexing techniques is employed to extract the body text, title, headers, email address(es) and URL(s) associated with each message or chat communication data. The exact details of the indexing operation can be specified by the user. The Indexing Manager 14 will pass the indexed data on to the Summary Manager 16.

Summary Manager 16: Summary Manager 16 generates a user-defined, human-interpretable extendible mark-up language ("XML") summary of the indexed data given to it by the Indexing Manager 14. Such a summary will include XML tags that explicitly delineate the email address(es), URL(s), text and other attributes present in the data which are desired by the user. The Summary Manager 16 can forward the summarized data to the Database Manager 18.

Database Manager 18: Database Manager 18 stores the summarized data into a back-end database. Further Database Manager 18 notifies the User Interface 10 of the addition that has been made to the database 26, and the user interface 10 updates its graphical display, so that the data being summarized in real-time is immediately visible to the user. The Database Manager 18 is responsible for managing all storage activity, and referencing the stored data so as to make it accessible for rapid retrieval.

The Database Manager 18 may have search engine capability built into it. This will enable Database Manager 18 to search the contents of the database to retrieve entries that match the specifications of the Query Manager 20, whenever a search query is initiated by the user.

Query Manager 20: Query Manager 20 permits the user to query the contents of the database by searching for the occurrence of one or more keywords. When the user enters a search query, Query Manager 20 queries Database Manager 18 with the keywords. Subsequently, Database Manager 18 returns a list, whose elements are pointers to database entries (as opposed to the physical entries themselves). Query Manager 20 then notifies the User Interface 10, which displays these results to the user in a separate window from that in which all the summarized content of the online communication is being displayed.

Furthermore, the query entered by the user is persistent. This means that as the contents of the database change, Database Manager 18 preferably "remembers" the last query made by the Query Manager 20, and notifies Query Manager 20 if any newly added data matches the query specification.

In turn, Query Manager 20 will notify User Interface 10, which will dynamically update the graphical "query results" display being seen by the user, thus reflecting the addition to the database in real-time.

Query Manager 20 can also be configured to handle multiple queries at the same time. In the event that the user specifies more than one query, Query Manager 20 will merely spawn off multiple (synchronized) threads, with each thread of execution corresponding to a unique query. In this case, all of these queries will be persistent. The advantage of implementing the Query Manager 20 using threads is that this allows Query Manager 20 to process multiple search queries in parallel, without interrupting the operation of any other component of the system.

Figure 2:
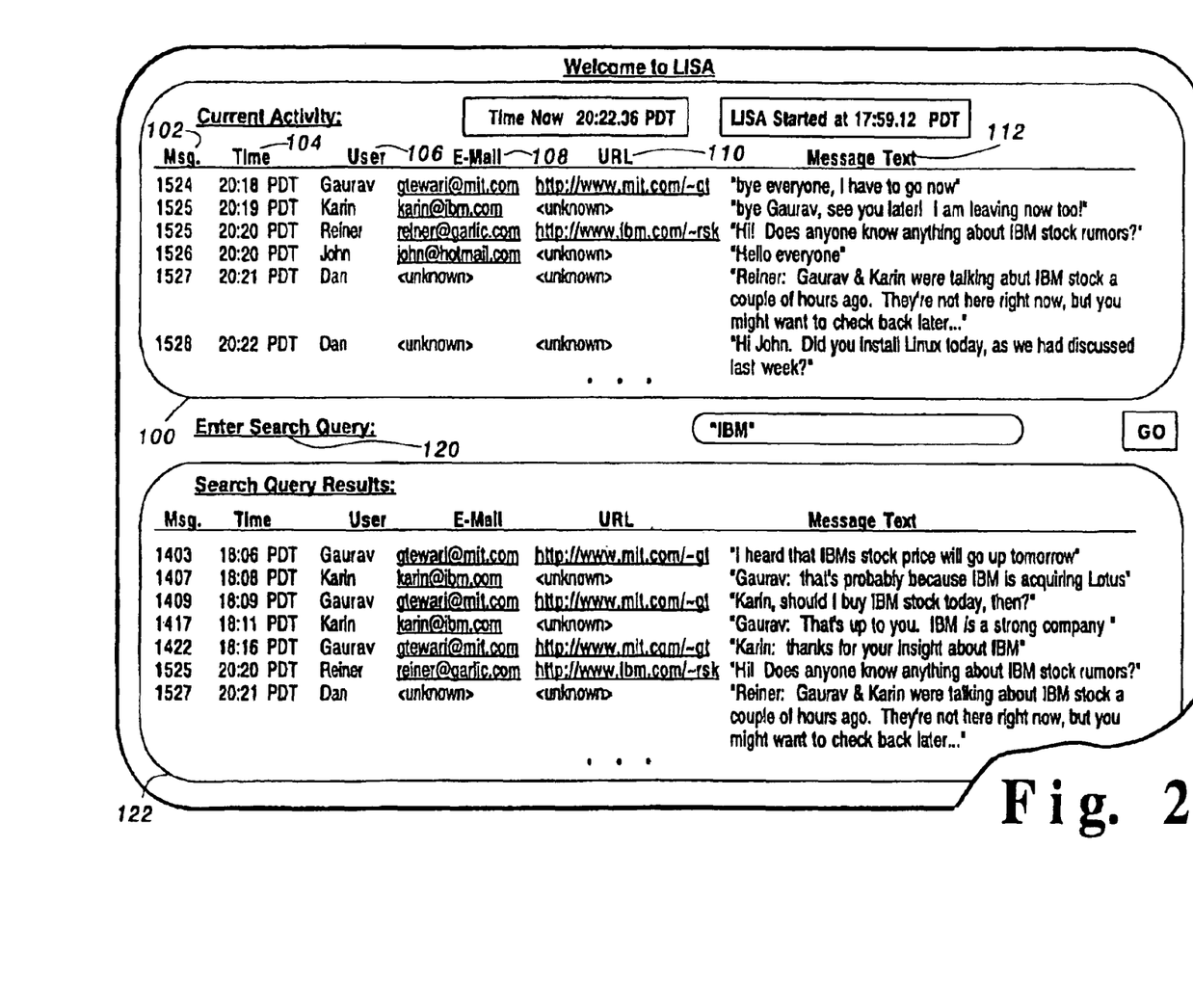
FIG. 2 is a pictorial representation of a typical graphic display using LISA.
Figure 3:
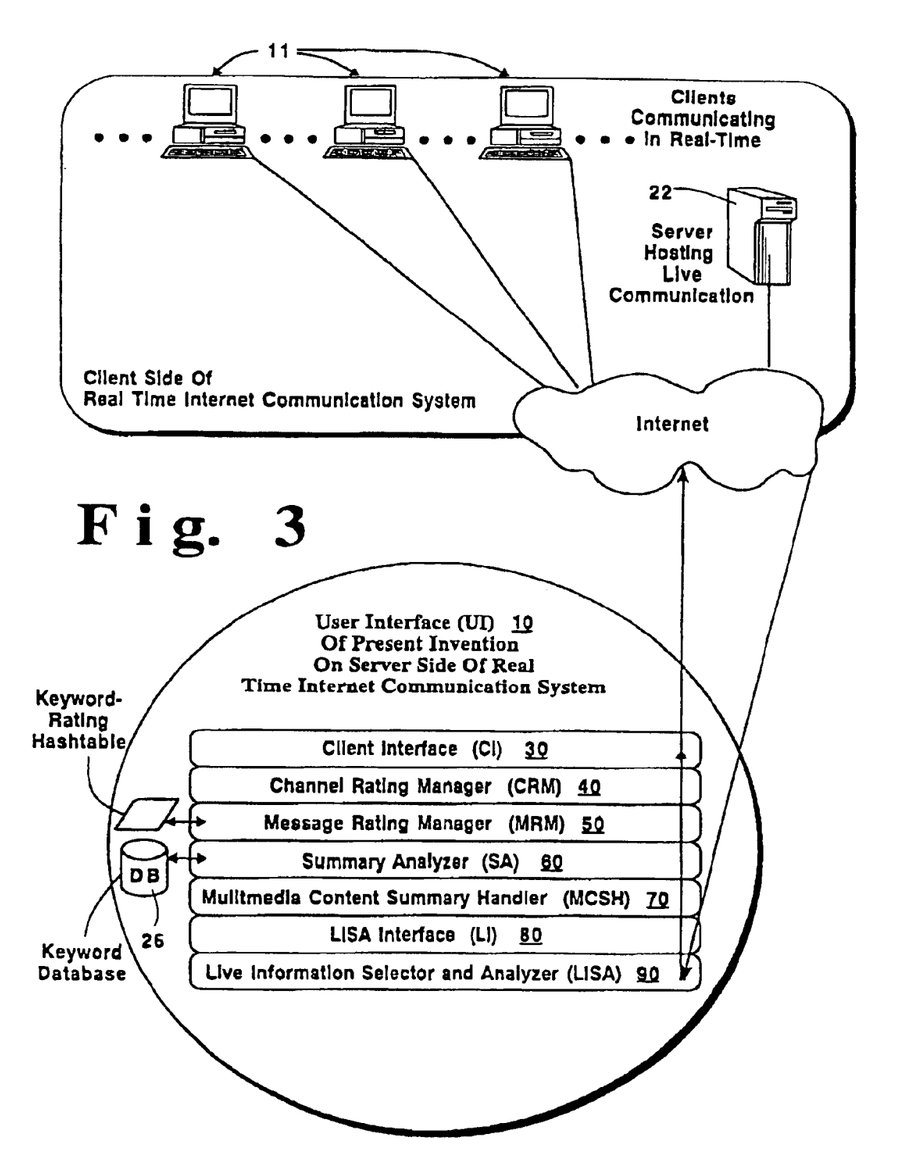
FIG. 3 is a schematic representation of the typical components of the present invention as used for real-time communication content selection as connected to the Internet.

FIG. 2 is a pictorial illustration of a typical interactive graphic display that LISA can present to a user. For example, LISA has been configured to monitor the real-time communication in a chat room. The current activity in the chat room is illustrated in screen 100. As seen in screen 100, the typical parameters that can be monitored and stored by LISA are the message number 102, the time 104, the user name 106, the user's e-mail address 108, the URL for the user's server 110, and the message text 112. In this example, LISA was started at 17:59:12. The user can then prompt LISA and query 120 the stored results for the occurrence of the keyword "IBM." The results of query 120 are displayed in screen 122. Each message that LISA detected and stored that includes the keyword "IBM" is displayed, along with the specified parameters.

The present invention permits real-time rating, classification and subsequent clustering of chat rooms based upon the discourse content. By exploiting the functionality inherent to LISA, it will be able to monitor the conversation being held in any given chat session, or any other such form of real-time communication on the Internet. The present invention works by extracting and analyzing the summary information generated by LISA. Specifically, based upon the specifications of the system user or client, the invention looks for the temporally contiguous occurrence of a particular keyword or set of keywords. (Unless otherwise specified, the term "user" refers to the human operator of the present system, while the term "client" refers to a human participant in the live online communication at a client computer attached to the network.) The appearance of such keywords will be used to rate the language and theme of the conversation. As messages continue to be exchanged, the system computes a rating for each message and preferably maintains a running, weighted average of these ratings to compute an overall rating for the chat room.

Optionally, the invention may be configured to deal with non-text content such as audio and images. In the case of audio, standard voice recognition software can be used to convert such data into text. Text data can then be parsed and its content scanned for keywords, as described above. In the case of video or graphical images, image processing software can be employed to recognize discrete objects in regions within an image file. Software systems are capable of using techniques known in the art, including filters, shape-based indexing, and matching using Daubechies' Wavelets to identify the discrete objects. These discrete objects become the analogs of keywords in text and audio content. In this case, the database of the present invention stores basic images of discrete objects that can be recognized by these software systems.

Using LISA's multithreaded capabilities, the system may monitor multiple chat rooms at the same time, and post the real-time computed ratings for the chat room onto a portal site. In addition to the current rating, the portal graphical user interface (GUI) more preferably also determines and displays a Rating History Graph (RHG) showing the history of ratings, as computed during an immediately completed selected time period, where the time period is specified by the user. The GUI may also determine and display the high and low ratings in the range of ratings computed during immediately completed selected time period, where this latter time period may also specified by the user, and be the same or different from the former time period. Optionally, the system may be configured to determine and display other comparative statistics of interest such as average rating, median rating, standard deviation, present multiple ratings for a single chat room by giving different weights to different types of content. For instance, a user at a client computer may want to see how the rating changes when images are given twice as much weight as text.

The computer program or software incorporating the process steps and instructions described further below may be stored in one or both of the client computer(s) or network computer or server, in conventional computer readable source or other program code, on an otherwise conventional program storage device, such as a semiconductor chip, a read-only memory, optically read media such as a CD- or DVD-ROM, or magnetic media such as a diskette or computer hard drive.

In its preferred embodiment, the present invention includes of the following major components:

1) User Interface (ULI)—10
2) LISA Interface (LI)—80
3) Multimedia Content Summary Handler (MCSH)—70
4) Summary Analyzer (SA)—60
5) Message Rating Manager (MRM)—50
6) Channel Rating Manager (CRM)—40
7) Client Interface (CI)—30

The function of each of these components is discussed below in connection with FIG. 3, which describes the novel combination of components of the present invention which are in addition to the Live Information Selector and Analyzer (LISA) 90 components described in connection with FIG. 1.

User Interface (UI)

As described previously, the User Interface (UI) 10 represents the software component within the framework which will directly interact with the user of the system. All interactions between the user and the system are mediated by the UI. The UI is responsible for getting LISA configuration parameters directly from the user and propagating these to the LISA Interface (LI). The operation of the UI will require that the user specify sufficient parameters so that LISA is able to monitor, index and summarize the relevant information. Thus, for instance, in the case of an Internet chat session, the user would have to specify the URL of the chat room he or she is interested in, so that LISA knows where to look for the relevant data.

The UI is also responsible for prompting the user to specify keywords or sets of keywords (and basic images of discrete objects if rating of image content is also desire), and passing these on to the Summary Analyzer (SA). Additionally, a mapping must be specified by the user between keywords and ratings. The UI indexes all specified keyword-rating pairs in a back-end database, and informs the Summary Analyzer (SA) of the contents of this database as well as of the mapping between keywords and ratings. It should be noted that for non-text, multimedia message content, the term keyword includes the appropriate analogous video or graphical unit, such as basic images of discrete objects in the case of images.

LISA Interface (LI)

The LISA Interface (LI) 80 software component links the framework of the present invention with the LISA application program. All interactions between the system and LISA are mediated by the LI. Using the LI, and the user-specified parameters obtained from the User Interface (UI), the system is able to configure the operation of LISA. In addition to configuring LISA with the appropriate parameters, the LI is responsible for collecting the summarized date output by LISA and propagating this onto the Multimedia Content Summary Handler (MCSH) 70.

Multimedia Content Summary Handler (MCSH)

The Multimedia Content Summary Handler (MCSH) 70 is the component of the system that permits the successfully delineation of keywords in the message content or keyword analogs, when dealing with non-text, multimedia message content. The operation of the MCSH is dependent upon user specifications made through the UI. For non-text messages, the MCSH extracts or constructs the appropriate keyword analog. For instance, in the case of image content, the MCSH will employ techniques known in the art, such as filters, shape-based indexing, and matching using Daubechies' Wavelets to identify the discrete objects.

Summary Analyzer (SA)

The Summary Analyzer (SA) 60 software component is responsible for dynamically analyzing the summary being output in real-time by LISA. In particular, the SA interfaces with a keyword database and checks for the occurrence of user specified keywords in the summaries that it analyzes. Based upon a partial or complete match with one or more sets of user-specified keywords, the SA determines that the summary in question is of relevance. Subsequently, the summary will be "marked" and passed on to the Message Rating Manager (MRM) 50, along with a list of the keywords or sets of keywords that it was found to have matched.

Message Rating Manager (MRM)

The Message Rating Manager (MRM) 50 software component of the system actually determines what rating should be assigned to a particular message, exchanged in real-time in a chat room, which matches the user's specifications. The MRM maintains a user-specified mapping between keywords and ratings. In the event that a given message contains multiple keywords, which may map to different ratings, the MRM may construct a weighted, aggregate rating. The exact criteria and weighting to be used in the construction of this aggregate rating may be specified by the user via the UI. Alternatively, the user may choose to specify a ranking among the candidate ratings, and may wish to impose special conditions, such as requiring that the highest rating matched by any keyword in a given message should become the overall rating for the message.

Once the MRM has selected an acceptable rating, the MRM passes it on to the Channel Rating Manager (CRM) 40, along with the "marked" summary corresponding to the message. Additionally, the e-mail address, chat nickname and URL of the client computer originator of the message, if available from the summary generated by LISA, may also be propagated to the CRM by the MRM. Such information can then be used for higher level applications. For instance, chat host servers could use such information to identify disruptive and undesirable chatters, and subsequently take suitable action against them, such as terminating them from the chat room.

Channel Rating Manager (CRM)

The Channel Rating Manager (CRM) 40 software component of the system determines what overall rating should be assigned to the real-time communication channel (chat room) being monitored. The CRM maintains a running, weighted aggregated rating across all the individual message ratings produced by the MRM, to deduce a real-time, continuously updated, overall rating for the chat room. The exact criteria and weighting to be used in the construction of this aggregate rating may be specified by the user via the UI. For instance, a simple weighting scheme may be to assign relative weights based on relative message lengths, or number of keywords encountered in the message. Alternatively, the user may choose to impose special conditions, such as requiring that the highest rating matched by any message during the past X minutes (where X is specified by the user) should become the overall rating for the room. Once the CRM has deduced a rating, the rating, along with the name of the chat room to which the rating corresponds to, will be sent to the Client Interface (CI) 30.

Client Interface (CI)

The Client Interface 30 is the component of the system which actually forms the link between the system and the real-time communication channel client, i.e., the human participant of a software application program being used by the participant. The CI is responsible for actually presenting the ratings generated by the system to the client computer.

In general, all interaction between the system of the present invention and the user is mediated by the UI, and each component interacts with the UI. The individual components of the present system are preferably arranged in an elegant, hierarchical layering which minimizes the necessary interactions, and thus provides robustness. Also, the flow of information is preferably strictly linear; information from the external real-time communication system is obtained using LISA, and information to the communication system is sent using the CI.

In particular, depending upon the user's specifications, the CI may present the rating information in many different forms, and in many different levels of detail. For instance, the user may specify that in addition to the current rating, the CI should also construct and present a Rating History Graph (RHG) showing the history of ratings, as computed during the past X minutes, where X is to be specified by the user. The CI may also deduce and present the "high" and "low" of ratings computed during the last Y minutes, where Y is to be specified by the user, and where Y may be the same or different from X. Similarly, the CI can be configured to dynamically compute and present other interesting comparative statistics such as average rating, median rating, standard deviation, present multiple ratings for a single chat room by giving different weights to different types of content (for instance, a given client may want to see the rating changes when images are given twice as much weight as text) etc. Furthermore, if the system of the present invention is implemented as a fee-based, restricted access service, an access control mechanism would also be implemented using the CI. The CI can either present such rating information via a Web portal gateway site in-human-interpretable format, or it can permit client application programs to directly interface with it, and provide this information in machine understandable form.

Preferably, all components of the system will make use of XML (Extensible Markup Language) for primary data representation and exchange. This will provide several advantages in terms of search features, interoperability with other third party applications and machine-to-machine data exchange.

The invention may be extremely valuable to chat room participants and chat hosts, as well as to other concerned third parties, such as parents of underage chat room participants, or employers of chatters connecting from the workplace, and the like. Potentially, the method and system of the present invention may be implemented as a third party fee-based Web service. The revenue model could either involve concerned parents and employers paying nominal fees to subscribe to the ratings, or could involve chat-room hosts employing the present invention to monitor and provide real-time ratings for their rooms. As such, a portal site using the present invention may become a chat-room guide for potential participants, who will be able to get a much more accurate and standardized comparison of the nature and theme of the content being exchanged in various chatrooms, as compared to currently existing methods.

Further, a connection with the portal site of the present invention could be implemented as a plug-in within currently existing chat client programs or within Internet browsers. As such, all chat client-side software may have the option of interfacing and checking with the server maintaining the method and system of the present invention before connecting to a given chat room. This could be extremely valuable for parents, who would be able to specify (password protected) acceptable thresholds of rating levels, according to which their children will either be given, or denied access to join a given online communication session. The crucial point to note is that the rating provided by the present method and system is continuously updated in real-time. The child will automatically be ejected from the chat room if at any moment its rating changes so as to violate the parent-specified threshold.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of monitoring real-time communication on a computer network between at least two client computers connected by the network comprising:

providing a database of keywords, each of said keywords linked to a predefined rating;

monitoring real-time communication on a computer network between at least two client computers connected by the network;

detecting said keywords in the real-time communication;

determining for the real-time communication a rating level based upon the predefined rating of said keywords;

connecting at least one additional client computer to the network without establishing real-time communication with said at least two client computers, wherein the rating level of the real time communication is conveyed to the at least one additional client computer; and connecting the at least one additional client computer to the real-time communication based upon the rating level, wherein the at least one additional client computer receives the real time communication.

2. The method of claim 1 wherein the rating level of the real time communication is conveyed to at least one of the client computers.

3. The method of claim 1 wherein the determining of the rating level for the real time communication occurs simultaneously with the real time communication.

4. The method of claim 1 wherein the determining of the rating level for the real time communication is based on evaluation of individual ratings of a plurality of different keywords.

5. The method of claim 1 further including terminating the real time communication of at least one of the client computers based upon the rating level.

6. The method of claim 1 including predetermining at a first of the at least two client computers a maximum rating level at which the real time communication may be maintained; originating one or more keywords at a second of the at least two client computers which triggers a rating level above the maximum rating level; and terminating real time communication of the first client computer.

7. The method of claim 1 further including predetermining a maximum rating level at which the real time communication may be maintained; originating one or more keywords at one of the client computers which triggers a rating level above the maximum rating level; and identifying the one client computer originating the keyword above the maximum rating.

8. The method of claim 1 including predetermining a maximum rating level at which the real time communication may be maintained; originating one or more keywords at one of the client computers which triggers a rating level above the maximum rating level; and terminating real time communication of the one client computer.

9. The method of claim 1 further including continuously updating the rating level determined for the real time communication.

10. The method of claim 1 further including continuously updating the rating level determined for the real time communication based upon the highest keyword rating within a selected time period.

11. The method of claim 1 further including continuously updating the rating level determined for the real time communication based upon a weighted average of keyword ratings within a selected time period.

12. The method of claim 1 further including determining the range of the rating level determined for the real time communication based upon highest and lowest keyword ratings within a selected time period.

13. The method of claim 1 further including connecting a subsequent client computer to the network without establishing real time communication; viewing at the subsequent client computer the rating level of the real time communication; and connecting the subsequent client computer to the real time communication based upon the rating level.

14. The method of claim 1 wherein separate real time communication occurs between different groups of client computers, and including determining a rating level for the real time communication for each group of client computers.

15. The method of claim 1 wherein the keyword is selected from the group consisting of text, audio, video and graphical communication.

16. A method of monitoring real time communication on a computer network between at least two client computers connected by the network comprising:

providing a real time communication monitoring system on a computer network including a database of keywords, each of said keywords linked to a predefined rating;

the system adapted to:
 i) monitor real time communication between at least two client computers connected by the network;
 ii) detect said keywords in the real time communication; and
 iii) determine for the real time communication a rating level based upon the predefined rating of said keywords;

connecting a subsequent client computer to the network without establishing real time communication with the at least two client computers;

viewing at the subsequent client computer the rating level of the real time communication between the at least two client computers; and connecting the subsequent client computer to the real time communication based upon the rating level.

17. A system for monitoring real-time communication on a computer network between at least two client computers connected by the network comprising:

a database of keywords, each of said keywords linked to a predefined rating;

means for monitoring real-time communication on the computer network between the at least two client computers connected by the network;

means for detecting said keywords in the real-time communication;

means for determining for the real-time communication a rating level based upon the predefined rating of said keywords;

means for connecting a subsequent client computer to the network without establishing real-time communication with the at least two client computers; and means for connecting the subsequent client computer to the real-time communication based upon the rating level.

18. A computer program product for monitoring real-time communication on a computer network between at least two client computers connected by the network comprising:

a database of keywords, each of said keywords linked to a predefined rating;

program code means for monitoring real-time communication on the computer network between the at least two client computers connected by the network;

program code means for detecting said keywords in the real-time communication;

program code means for determining for the real-time communication a rating level based upon the predefined rating of said keywords;

program code means for connecting a subsequent client computer to the network without establishing real-time communication with the at least two client computers; and program code means for connecting the subsequent client computer to the real-time communication based upon the rating level.

19. A program storage device readable by a machine, tangibly embodying a program of instructions executable by the machine to perform a method for monitoring real-time communication on a computer network between at least two client computers connected by the network using a database of keywords, each of said keywords linked to a predefined rating, the method comprising:

monitoring real-time communication on the computer network between the at least two client computers connected by the network;

detecting said keywords in the real-time communication;

determining for the real-time communication a rating level based upon the predefined rating of said keywords;

connecting a subsequent client computer to the network without establishing real-time communication with the at least two client computers; and connecting the subsequent client computer to the real-time communication based upon the rating level.

* * * * *